(12) United States Patent
Butz et al.

(10) Patent No.: US 7,343,935 B2
(45) Date of Patent: Mar. 18, 2008

(54) GAS FLOW CONTROL FLAP OPERATING MECHANISM

(75) Inventors: Hans Butz, Esslingen (DE); Hermann Büter, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 358 days.

(21) Appl. No.: 11/178,699

(22) Filed: Jul. 11, 2005

(65) Prior Publication Data

US 2005/0249546 A1   Nov. 10, 2005

Related U.S. Application Data

(63) Continuation-in-part of application No. PCT/EP03/13444, filed on Nov. 28, 2003.

(30) Foreign Application Priority Data

Jan. 17, 2003   (DE) .............................. 103 01 532

(51) Int. Cl.
  *B60H 1/24* (2006.01)
(52) U.S. Cl. .................... 137/637.1; 403/143
(58) Field of Classification Search ............... 137/637, 137/637.1, 883; 251/279; 403/122, 143
  See application file for complete search history.

(56) References Cited

U.S. PATENT DOCUMENTS

| | | | | |
|---|---|---|---|---|
| 1,936,556 A | * | 11/1933 | Lautz | ....................... 74/579 R |
| 3,299,721 A | | 1/1967 | Ziegler | |
| 3,699,580 A | * | 10/1972 | Joseph et al. | ................ 343/702 |
| 4,360,284 A | * | 11/1982 | Brandenburg | ............... 403/133 |
| 5,234,195 A | * | 8/1993 | Janisch | ........................ 251/279 |
| 6,161,451 A | * | 12/2000 | Gleason, II | ............... 74/579 R |

FOREIGN PATENT DOCUMENTS

| | | |
|---|---|---|
| DE | 1 775 764 | 10/1971 |
| DE | 42 23 727 | 1/1994 |
| DE | 43 02 504 | 6/1994 |
| DE | 100 41 265 | 3/2002 |
| FR | 2 420 685 | 10/1979 |
| FR | 0 211 736 | 2/1987 |

* cited by examiner

*Primary Examiner*—John Fox
(74) *Attorney, Agent, or Firm*—Klaus J. Bach

(57) ABSTRACT

In a gas flow control flap operating mechanism including a ball-head joint provided between an actuator drive and the gas flow control valve flap with a ball head which is received in a multipart ball-head socket, the parts of the ball-head socket are interconnected so that the ball-head socket is closed around the ball head and the ball-head socket is contained by a receiving part and includes locking means which hold the multipart ball-head socket in the receiving part and in engagement with the ball-head.

9 Claims, 4 Drawing Sheets

GAS FLOW CONTROL FLAP OPERATING MECHANISM

This is a Continuation-In-Part Application of International Application PCT/EP2003/013444 filed Nov. 28, 2003 and claiming the priority of German application 103 01 532.9 filed Jan. 17, 2003.

BACKGROUND OF THE INVENTION

The invention relates to a gas flow control flap operating mechanism for motor vehicles with at least one gas flow control flap which has at least one actuating part that is connected via at least one actuator to at least one actuating drive, the actuator being connected via a ball-head joint to the actuating drive, to the actuating part and/or to the gas flow control flap.

An air control device, in particular for heating and air-conditioning systems, is already known from DE 43 02 504 C1. Here, a pivotably arranged air flap and an actuating drive for the air flap are provided within a ventilation duct. Disposed between the actuating drive and the air flap is an actuator which has a ball joint at each of its ends.

It is the object of the present invention to provide a gas flow control flap with an operating mechanism such that manufacture and assembly of the operating mechanism are facilitated.

SUMMARY OF THE INVENTION

In a gas flow control flap operating mechanism including a ball-head joint provided between an actuator drive and the gas flow control valve flap with a ball head which is received in a multipart ball-head socket, the parts of the ball-head socket are interconnected so that the ball-head socket is closed around the ball head and the ball-head socket is contained by a receiving part and includes locking means which hold the multipart ball-head socket in the receiving part and in engagement with the ball-head.

As a result, the ball head is enclosed to a large angular degree by the multipart ball-head socket. With this enclosing of the ball head large adjustment forces which can act in the direction of the ball-head shank can be accommodated, also tension forces, without causing disconnection of the joint.

It is advantageous for the ball-head socket to have a first part and a second part, the first part and the second part being connected in an articulated or pivotable manner. For assembly the ball head is inserted into one of the parts and the other part is simply correspondingly folded thereover, resulting in a substantially closed ball-head socket.

In a particular embodiment, the ball-head socket has a fastening part which can be connected in a rotationally fixed manner to a receiving part of the actuating drive member of the actuating part and/or of the gas flow control flap. The ball-head joint formed by the ball head and the ball-head socket can thus be integrated into the power transfer flow. The fastening part can be an integral part or be releasably connected to the ball-head socket. The ball head has a shank which is connected in a positive-locking manner to the adjacent actuator.

Furthermore, it is advantageous if the fastening part and the receiving part can be connected in a rotationally fixed manner, the fastening part having at least one elastic leg which can be latched to the receiving part. The latching ability ensures simple and rapid assembly. The fastening part is plugged into the receiving part, the plug-in connection for its part being designed in a rotationally fixed manner. As a result, the functional rotary movement of the ball-head joint occurs solely between the ball-head socket and the ball head.

For this purpose, it is also advantageous if the connection between the first part and the second part of the ball-head socket is established by a film hinge. The film hinge can be produced in a simple manner and satisfies the required elasticity or strength for assembly.

According to a preferred embodiment of the invention, the ball-head socket has an undercut portion so as to enclose the ball head over an angle of between 180° and 330°, in particular between 250° and 300°. The undercut can be provided according to the desired range of movement of the ball head in the ball-head socket.

It is of importance for the present invention that the first part and the second part of the ball-head socket each has at least one elastic leg which, in the assembled state, assume a position in which they are situated at opposite sides of a separating plane of the ball-head socket. For fastening the socket parts the two elastic legs are plugged into the correspondingly shaped receiving part. The elasticity of the legs ensures latching after plugging in and thus secures the ball-head joint when pulling forces in the direction of the shank of the ball head are effective. Security against twisting is provided by the multi-edge formfitting engagement between the fastening part formed by the two elastic legs and the receiving part.

In connection with the design and arrangement according to the invention, it is advantageous for a plurality of gas flow control flaps to be connected directly or via an actuating part to a common actuating rail, the actuating rail being operatively connected to the actuator and/or the actuating drive. A plurality of gas flow control flaps can thus be moved simultaneously and synchronously.

It is further advantageous for the actuating rail to be formed from plastic, a pivot bearing formed from plastic being provided between the actuating rail and the gas flow control flap or the actuating part. The plastic structure provides for weight savings and simple low cost manufacturing of the gas flow control flap operating mechanism.

It is additionally advantageous if the pivot bearing, which is a friction bearing, includes a securing part which can be latched in the actuating rail, the gas flow control flap and/or the actuating part and is provided with at least one stop face oriented perpendicularly to a bearing axis. The latchable securing part can thus be simply inserted into, and secured in, a corresponding mounting hole in the actuating rail, the gas flow control flap and/or the actuating part. The stop and the engagement of the securing part provide for a positive-locking connection, which is effective in parallel with the securing part, and in an opposite direction, between the securing part on the one hand and the actuating rail, the gas flap and/or the actuating part on the other hand. The engagement structure is formed by a retaining part 9 which has an oval cross section with respect to the axis of rotation and at the same time represents a twist guard.

Details and further advantages of the invention will become more readily apparent from the following description of preferred embodiments thereof on the basis of the accompanying drawings:

DESCRIPTION OF A PREFERRED EMBODIMENT

Figure 1:
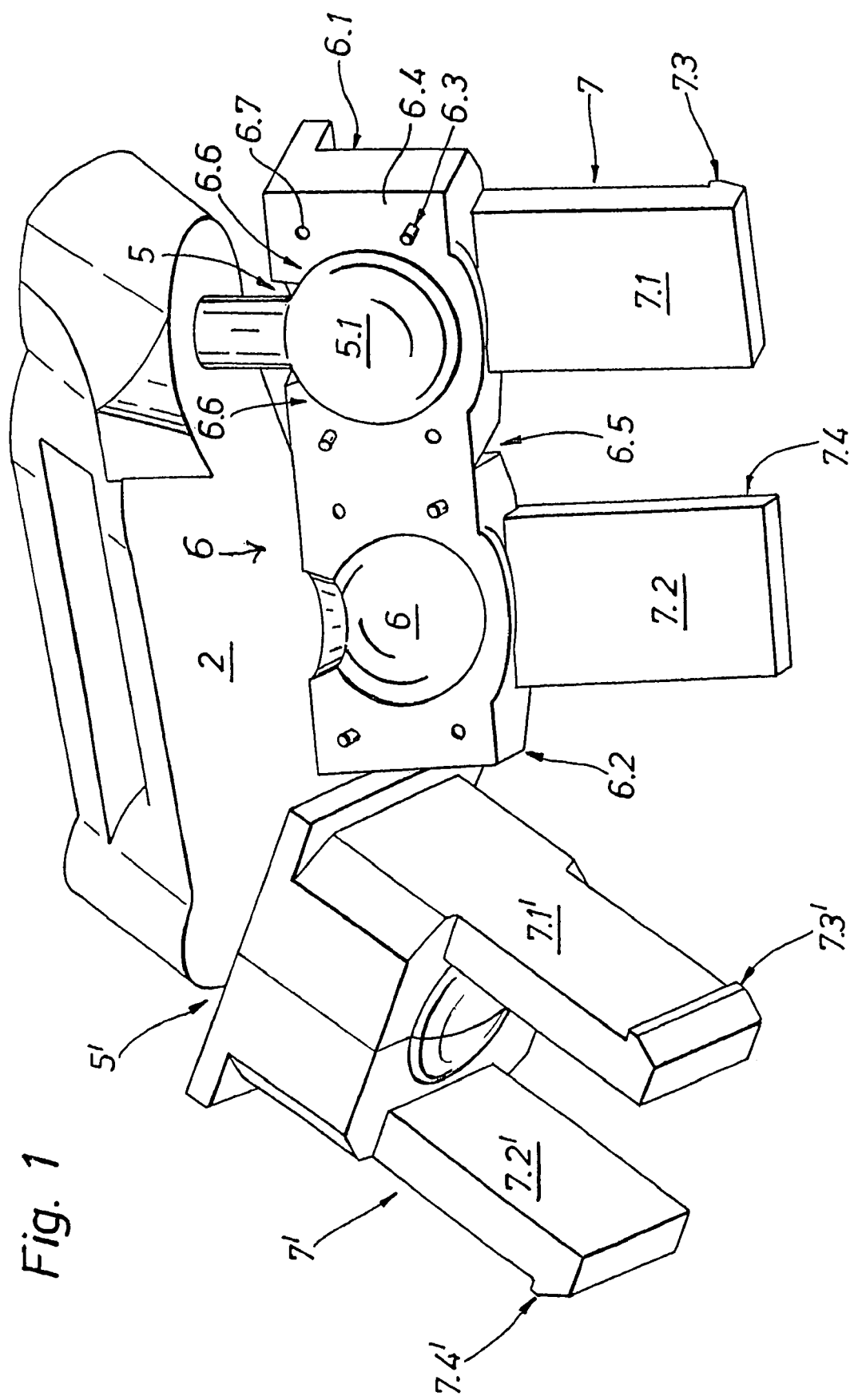
FIG. 1 is a perspective view of the actuator with ball head, ball-head socket and fastening part.

The actuator 2 and operating mechanism as shown in FIG. 1 includes two ball-head joints 5, 5'. Each of the ball-head joints 5, 5' consists of a ball head 5.1 and of a ball-head socket 6 which, in the assembled state, encloses the ball head 5.1 by approximately 300° by virtue of an undercut area 6.6. The ball head 5.1 formed, for example, from metal has a shank cast into the actuator 2 in a positive-locking manner. The ball-head socket 6 comprises two parts, the first part 6.1 and the second part 6.2 being interconnected pivotably via a film hinge 6.5. In the assembled state, the two parts 6.1, 6.2 have a common jointing plane 6.4 which, with the ball-head socket 6 in the open state, is stretched out in the plane of the respective jointing face 6.4.

After the ball head 5.1 has been placed into the first part 6.1, the ball-head socket 6 is closed by pivoting the second part 6.2. Provided on the jointing plane 6.4 are a plurality of securing pins 6.3 which are received in corresponding securing holes 6.7 or depressions, with the result that a relative movement of the two ball-head socket parts 6.1, 6.2 is prevented in the assembled state.

The ball-head socket 6 additionally has a fastening part 7. The fastening part 7 essentially consists of two elastic legs 7.1, 7.2 which are respectively arranged on the first part 6.1 and on the second part 6.2 of the ball-head socket 6. The elastic legs 7.1, 7.2 are oriented parallel to the jointing plane 6.4. In the assembled state, the two elastic legs 7.1, 7.2 are arranged opposite one another or with mirror-image symmetry with respect to the jointing plane 6.4. The elastic legs 7.1, 7.2 each have a retaining lug 7.3, 7.4 which, as shown in FIG. 2, latches with the receiving part 4.1.

Figure 2:
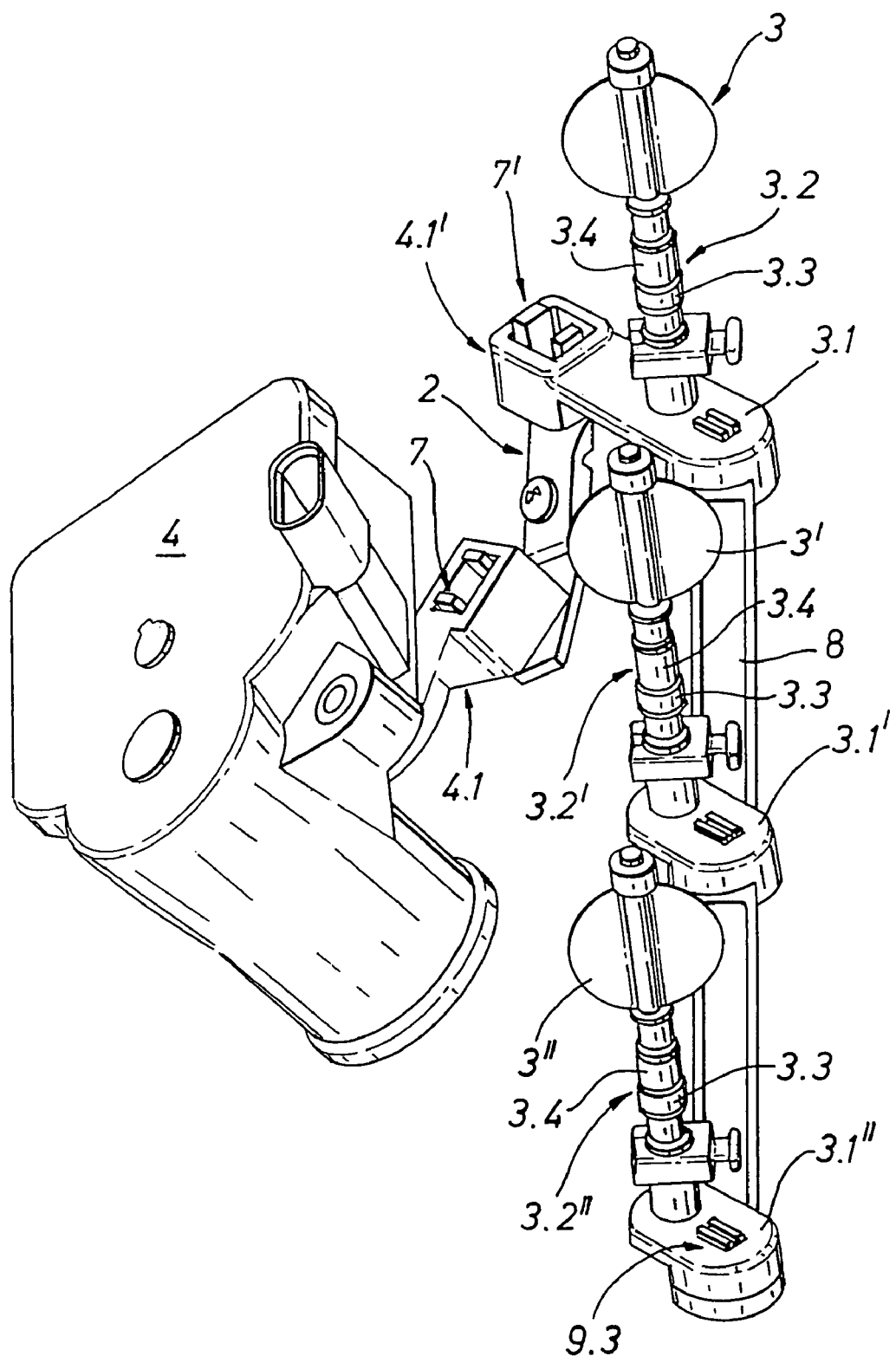
FIG. 2 is a perspective view of the gas flow control flap operating mechanism from below with actuating drive, actuator, actuating part, actuating rail and gas flow control flaps.

According to FIG. 2, an actuating drive 4 is mechanically connected to the actuator 2 via a receiving part 4.1, and the actuator 2 is mechanically connected to the gas flow control flap 3 via an actuating member 3.1. The further gas flow control flaps 3', 3" each have an actuating member 3.1', 3.1", all actuating members 3.1-3.1" being mechanically coupled via an actuating rail 8. The gas flow control flaps 3-3" each have a gas flow control flap spindle 3.2-3.2" with seal 3.3-3.3" and spacer 3.4-3.4", which not only form part of a pivot bearing structure (not shown) but also form part of a gas flow duct (not shown).

The actuator 2 has two opposite ends disposed within the receiving part 4.1 of the actuator drive 4 and within the receiving part 4.1' of the actuating member 3.1 by way of the fastening parts 7, 7'. The receiving part 4.1 has a square shape and thus prevents rotation of the fastening part 7, relative to the receiving part 4.1, the elastic legs 7.1, 7.2 of the fastening part 7 having a corresponding parallel orientation.

As shown in FIG. 2, the retaining lugs 7.3, 7.4 (FIG. 1) come to rest against, or latch against, that side of the respective receiving part 4.1, 4.1' situated opposite the actuator 2. The receiving part 4.1, 4.1' is firmly attached thereby to the fastening part 7, 7'.

Figure 3:
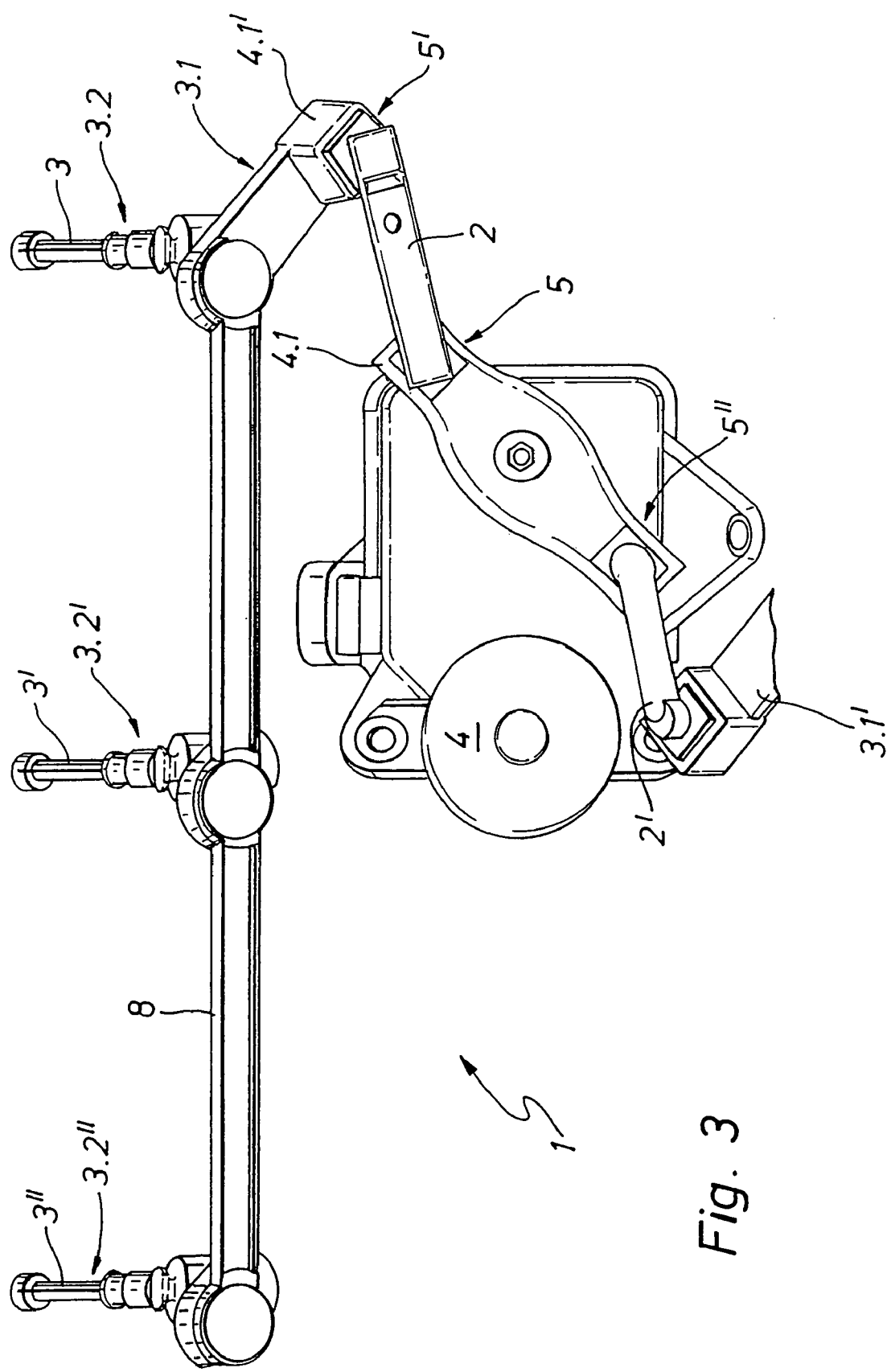
FIG. 3 shows a perspective view of the gas flow control flap operating mechanism from above.

According to FIG. 3, the actuating drive 4 is connected to a first actuating rail 8 and to a second actuating rail (not shown). For this purpose, the actuating drive 4 has two ball-head joints 5, 5" for connection to a respective actuator 2, 2'. The respective actuator 2, 2' in turn has a second ball-head joint 5' which forms the connection to the actuating part 3.1 of the respective actuating rail 8 or the gas flow control flap 3. In this arrangement, at least one actuator 2 is adjustable in its length, thereby ensuring a possibility of adjusting the two actuating rails 8 relative to one another.

Figure 4:
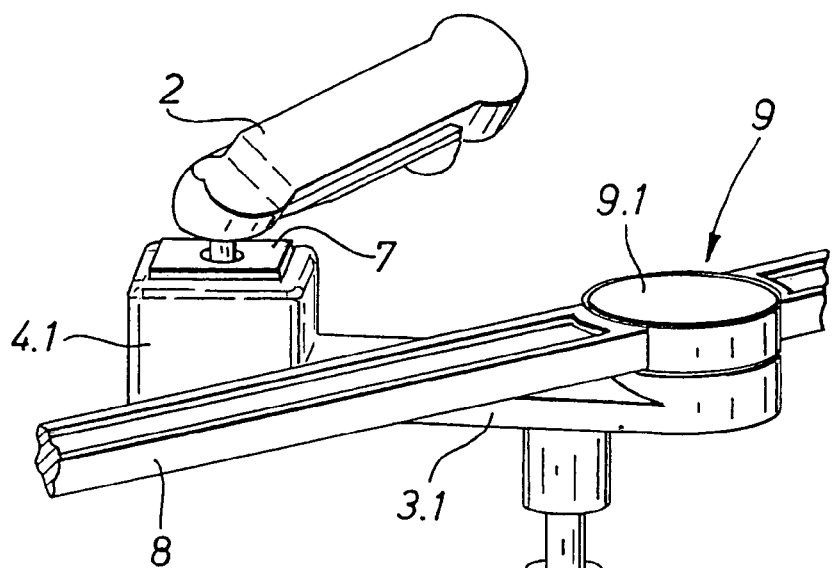
FIG. 4 is a partial perspective view of the operating mechanism with actuating rail and pivot bearing.
Figure 5:
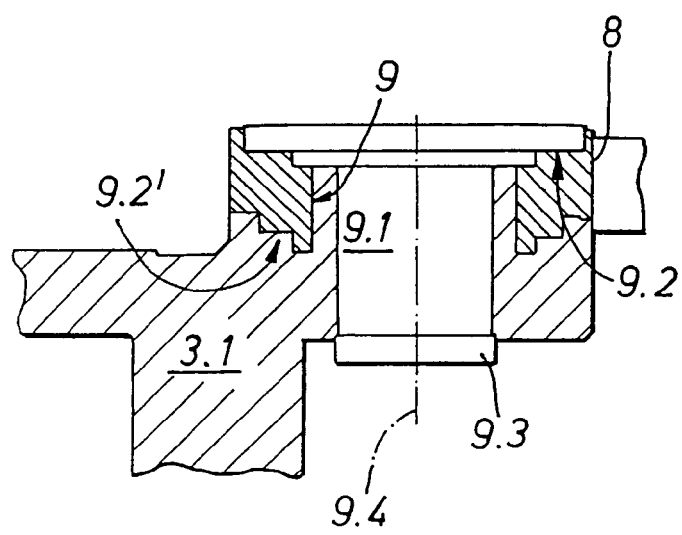
FIG. 5 is a the pivot bearing in a cross-sectional view.

According to FIG. 4, a pivot bearing 9 formed from plastic and designed as a friction bearing is provided between the actuating rail 8 and the actuating member 3.1. The pivot bearing 9 has a retaining member 9.1 which butts against the actuating rail 8 and can be latched to the actuating member 3.1 so as to hold the pivot bearing 9 together in the axial direction. As shown in FIG. 5, the retaining member 9.1 bears against the actuating rail 8 and against the actuating member 3.1 by way of a stop face 9.2. In this arrangement, a bearing shaft 9.4 extends approximately perpendicularly to the stop face 9.2. On its side situated opposite the stop face 9.2 the retaining member 9.1 has a retaining structure 9.3 which forms a clip and which, as shown in FIG. 5, prevents the retaining member 9.1 from being released from engagement with the actuating member 3.1. The retaining structure 9.3 is elongate or oval in cross section with respect to the axis of rotation and thus simultaneously forms a rotational locking structure.

Provided between the actuating rail 8 and the actuating member 3.1 on the one hand and between the actuating rail 8 and the retaining member 9.1 on the other hand is a labyrinth seal which is formed by the step-shaped stop faces 9.2, 9.2'.

What is claimed is:

1. A gas flow control flap operating mechanism (1) for motor vehicles including at least one gas flow control flap (3) which has at least one actuating member (3.1), at least one actuator (2) and an actuator drive (4), the actuator (2) being connected to at least one of the actuator drive (4), the actuating member (3.1) and the gas flap (3) via a ball-head joint (5) including a ball head (5.1) and a multipart ball-head socket (6) which engages the ball head (5.1) from opposite sides, and a receiving part (4.1, 4.1') enclosing the multipart ball-head socket (6) so as to firmly hold the multipart ball-head socket (6) in engagement with the ball-head (5.1), the multi-part ball-head socket (6) comprising a first part (6.1) and a second part (6.2), the first part (6.1) and the second part (6.2) being pivotable interconnected and being pivoted onto the ball head (5.1) so as to abut each other and firmly engage the ball head therebetween, said receiving part (4.1, 4.1') being disposed around the closed ball head socket (7) for firmly holding the socket parts (6.1, 6.2) in engagement with the ball head (5.1), said ball head socket (7) having elastic legs (7.1, 7.2) with retaining lugs (7.3, 7.4) for engaging the receiving part (4.1, 4.1') and holding it in position around the closed ball head socket (7).

2. The gas flow control flap operating mechanism as claimed in claim 1, wherein the fastening member (7) of the ball-head socket (6) is connected in a rotationally fixed manner to a receiving, part (4.1) connected to one of the actuating drive (4), the actuating member (3.1) and of the gas flow control flap (3).

3. A flow control flap operating mechanism according to claim 2, wherein the fastening member (7) and the receiving part (4.1) are connected in a rotationally fixed manner.

4. A flow control flap operating mechanism according to claim 2, wherein, in the assembled state of the first part (6.1)

and the second part (6.2), the elastic legs (7.1, 7.2) assume a position in which they are situated opposite each other with respect to a jointing plane (6.4) of the ball-head socket (6) and lock the ball-head socket (6) in the receiving part (4.1, 4.1').

5. A flow control flap operating mechanism according to claim 1, wherein the first part (6.1) and the second part (6.2) of the ball-head socket (6) are interconnected via a film hinge (6.5).

6. A flow control flap operating mechanism according to claim 1, wherein the ball-head socket (6) has an undercut area (6.6) and encloses the ball head (5.1) over an angle of between 180° and 330°.

7. A flow control flap operating mechanism according to claim 1, wherein a plurality of gas flow control flaps (3) are connected to a common actuating rail (7), the actuating rail (7) being operatively connected to at the least one of the actuator (2) and the actuating drive (4).

8. A flow control flap operating mechanism according to claim 7, wherein the actuating rail (8) is formed of plastic, a pivot bearing (9) formed from plastic being provided between the actuating rail (8) and the gas flow control flap (3) or the actuating member (3.1).

9. A flow control flap operating mechanism according to claim 8, wherein the pivot bearing (9), which is a friction bearing, includes a retaining member (9.1) which engages the actuating rail (8), the gas flow control flap (3) and the actuating member (3.1) and is provided with at least one stop face (9.2) extending perpendicularly to a bearing axis (9.4).

* * * * *